United States Patent
Tseng

(10) Patent No.: US 8,374,617 B2
(45) Date of Patent: Feb. 12, 2013

(54) METHOD AND APPARATUS FOR IMPROVING DRX FUNCTIONALITY

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 459 days.

(21) Appl. No.: 12/536,509

(22) Filed: Aug. 6, 2009

(65) Prior Publication Data

US 2010/0035624 A1 Feb. 11, 2010

Related U.S. Application Data

(60) Provisional application No. 61/087,173, filed on Aug. 8, 2008.

(51) Int. Cl.
*H04W 72/00* (2009.01)
(52) U.S. Cl. ........................ 455/450; 370/328
(58) Field of Classification Search ............... 455/67.11, 455/150.1, 436, 450; 370/328; 714/749
See application file for complete search history.

(56) References Cited

U.S. PATENT DOCUMENTS

| | | | | |
|---|---|---|---|---|
| 2007/0254656 | A1* | 11/2007 | Dalsgaard | 455/435.1 |
| 2008/0189970 | A1* | 8/2008 | Wang et al. | 33/701 |
| 2010/0037114 | A1* | 2/2010 | Huang et al. | 714/749 |
| 2010/0290509 | A1* | 11/2010 | Dalsgaard et al. | 375/220 |

OTHER PUBLICATIONS

3GPP TS 36.213 V8.3.0, "Evolved Universal Terrestrial Radio Access (E-UTRA); Physical layer procedures", May 2008.
3GPP TS 36.211 V8.3.0, "Evolved Universal Terrestrial Radio Access (E-UTRA); Physical channels and Modulation", May 2008.
3GPP, R1-081729, May 2008.
3GPP, R2-083795, "LTE RRC spec update", Jun. 2008.
3GPP TS 36.321 V8.2.0, "Medium Access Control (MAC) (Release 8)", May 2008.
Ericsson "Clarification on UE behavior for DRX and configured measurement gaps", 3GPP TSG-RAN2 Meeting #62bis, R2-083152, Jun. 30-4, 2008, p. 2 "3.1 Definitions" for "Active Time" and "Contention Resolution Timer", p. 4 "5.7 Discontinuous Reception (DRX)", XP050140584, Warsaw, Poland.
Nokia Corporation, Nokia Siemens Networks: "Measurement Gaps and DRX Timers", 3GPP TSG-RAN2 Meeting #64, R2-086085, Oct. 10-14, 2008, p. 2 "3.1 Definitions" for "DRX Inactivity Timer" and "DRX Retransmission Timer", XP050321149, Prague, Czech Republic.
ZTE: "DRX and measurement gap", 3GPP TSG-RAN WG2#63, R2-083984, Aug. 18-22, 2008, XP050319165, Jeju, Korea.
Panasonic: "Relation between DRX and Gap for Measurement", 3GPP TSG RAN WG2 #60, R2-074856, Nov. 5-9, 2007, XP050137362, Jeju, Korea.

\* cited by examiner

*Primary Examiner* — Patrick Edouard
*Assistant Examiner* — Myron W Wyche
(74) *Attorney, Agent, or Firm* — Blue Capitol Law Firm, P.C.

(57) ABSTRACT

A method for improving a Discontinuous Reception (DRX) functionality in a user equipment (UE) of a wireless communication system is disclosed. The method includes steps of configuring a timer for controlling the DRX functionality, which indicates the UE a time length to monitor a Physical Downlink Control Channel (PDCCH); and excluding a duration corresponding to a measurement gap from calculation of the time length when a running time of the timer is overlapped with the measurement gap.

12 Claims, 5 Drawing Sheets

METHOD AND APPARATUS FOR IMPROVING DRX FUNCTIONALITY

CROSS REFERENCE TO RELATED APPLICATIONS

This application claims the benefit of U.S. Provisional Application No. 61/087,173, filed on Aug. 8, 2008 and entitled "Method and Apparatus for improving ACK/NACK repetition", the contents of which are incorporated herein by reference.

BACKGROUND OF THE INVENTION

1. Field of the Invention

The present invention relates to a method and apparatus for improving a Discontinuous Reception (DRX) functionality, and more particularly, to a method and apparatus for handling a timer of the DRX functionality and a measurement gap in a user equipment (UE) of a wireless communication system, so as to enhance system scheduling efficiency.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE system, Discontinuous Reception (DRX) functionality is applied to MAC layer for allowing a user equipment (UE) to enter a standby mode during certain periods of time and stopping monitoring a Physical Downlink Control Channel (PDCCH), so as to reduce power consumption of the UE.

According to related protocol specifications, the DRX functionality is configured by Radio Resource Control (RRC) layer, an upper layer of RLC layer. If the DRX functionality is configured, whenever a new DRX cycle begins, an On Duration Timer is started and the UE is awaked to monitor the PDCCH until the On Duration Timer expires. In addition, when a DRX Inactivity Timer or a DRX Retransmission Timer is running, the UE also monitors the PDCCH to acquire information about whether the network has assigned resources for uplink transmission or whether the network has downlink data for the UE to receive.

During the time when the UE monitors the PDCCH, if the PDCCH indicates the UE to receive or transmit a new transmission packet, the DRX Inactivity Timer is started or restarted for allowing the UE to continue monitoring the PDCCH, so as to prevent missing reception or transmission of following packets or to reduce data transmission delay.

On the other hand, if the PDCCH indicates the UE to receive a packet but the packet cannot be decoded successfully on a Downlink Share Channel (DL-SCH), the MAC layer of the UE would perform a Hybrid Automatic Repeat Request (HARQ) process to request a retransmission of the packet. Since the UE would not receive any retransmission packet during a signaling round trip time (RTT) of the HARQ process, a HARQ RTT Timer is thus configured by the DRX functionality to allow the UE to enter into the standby mode during this round trip time. So the power consumption of the UE can further be saved.

After the HARQ RTT Timer expires, the DRX Retransmission Timer is started by the DRX functionality to awake the UE to start monitoring the PDCCH for detecting the retransmission packet of the HARQ process. In such a situation, if the retransmission packet of the HARQ process is successfully decoded, the DRX Retransmission Timer is stopped. Otherwise, the DRX Retransmission Timer is kept running until expiration, at which time the UE enters into the standby mode again.

In other words, the UE configured with the DRX functionality is allowed to stop monitoring the PDCCH during some period of time. The situations that the UE monitors the PDCCH when the DRX functionality is configured are summarized as follows: (1) when the On Duration Timer is running; (2) when the DRX Inactivity Timer is running; and (3) when the DRX Retransmission Timer is running. It is noted that the said timers and parameters used for controlling operation of the DRX functionality are configured by the RRC layer. Detailed operations of the DRX functionality can be referred to related specifications, and are not further narrated herein.

According to the current specifications, the said timers for controlling the DRX functionality may be overlapped with a measurement gap, i.e. a duration the RRC layer assigns to the UE for performing radio measurement. Since the UE is incapable of monitoring the PDCCH within the measurement gap, the network scheduling would be greatly limited if overlap occurs between the said timers and the measurement gap.

For example, if the DRX Retransmission Timer is overlapped with the measurement gap, the time that can be used by the network to schedule retransmission packets is reduced during the running time of the DRX Retransmission Timer, or even there is no chance for the network to schedule retransmission packets during the running time of the DRX Retransmission Timer. As a result, the network scheduling is greatly limited. Similarly, the problem may also occur to the DRX Inactivity Timer and the On Duration Timer.

SUMMARY OF THE INVENTION

It is therefore an objective of the present invention to provide a method and apparatus for improving a Discontinuous Reception (DRX) functionality in a user equipment (UE) of a wireless communication system.

According to the present invention, a method for improving a Discontinuous Reception (DRX) functionality in a user equipment (UE) of a wireless communication system is disclosed. The method includes steps of configuring a timer for controlling the DRX functionality, the timer indicating the UE a time length to monitor a Physical Downlink Control Channel (PDCCH); and excluding a duration corresponding to a measurement gap from calculation of the time length when a running time of the timer is overlapped with the measurement gap.

According to the present invention, a communications device for improving a Discontinuous Reception (DRX) functionality in a user equipment (UE) of a wireless communication system is disclosed. The communications device includes a processor for executing a program, and a memory, coupled to the processor, for storing the program. The program includes steps of configuring a timer for controlling the DRX functionality, the timer indicating the UE a time length to monitor a Physical Downlink Control Channel (PDCCH); and excluding a duration corresponding to a measurement gap from calculation of the time length when a running time of the timer is overlapped with the measurement gap.

These and other objectives of the present invention will no doubt become obvious to those of ordinary skill in the art after

DETAILED DESCRIPTION

Figure 1:
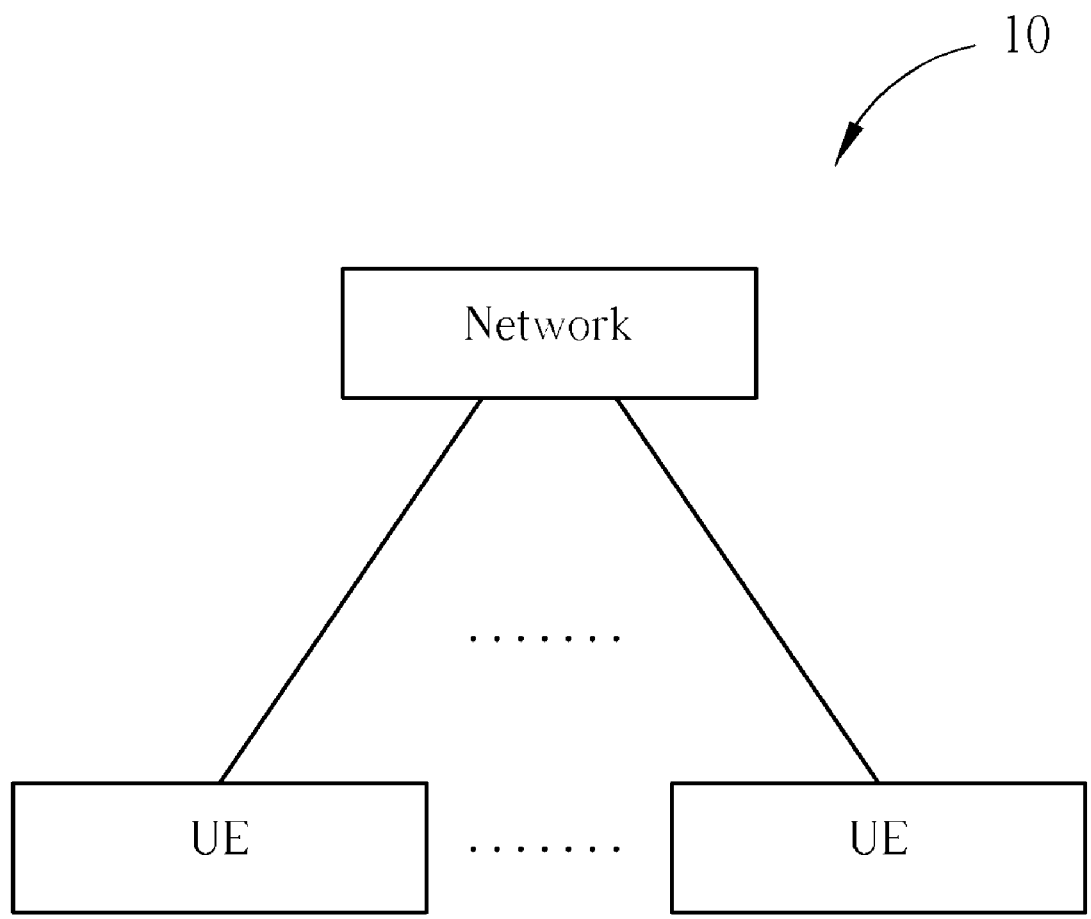
FIG. 1 is a schematic diagram of a wireless communications system.

Please refer to FIG. 1, which illustrates a schematic diagram of a wireless communications system 10. The wireless communications system 10 is preferred to be a Long Term Evolution (LTE) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
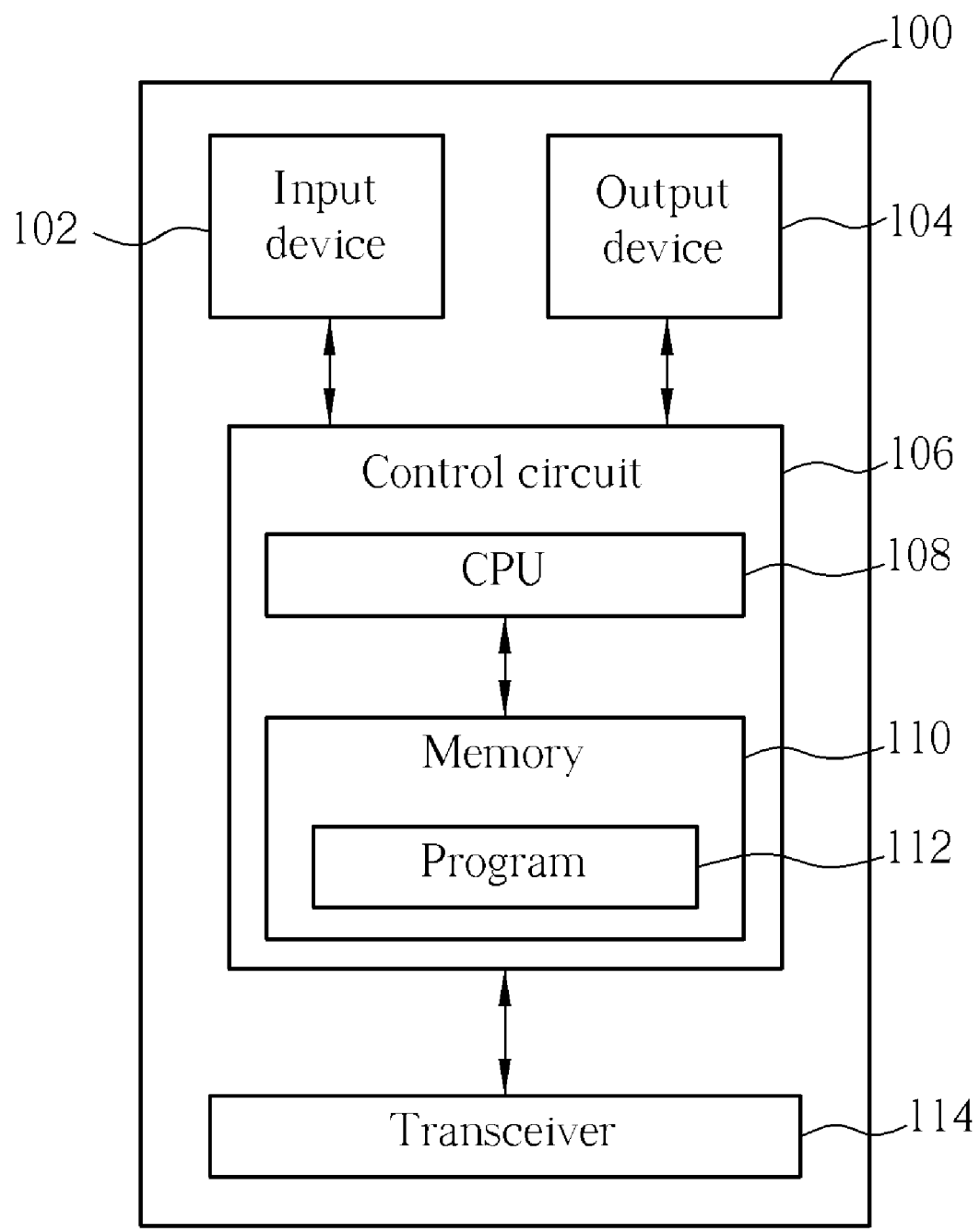
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
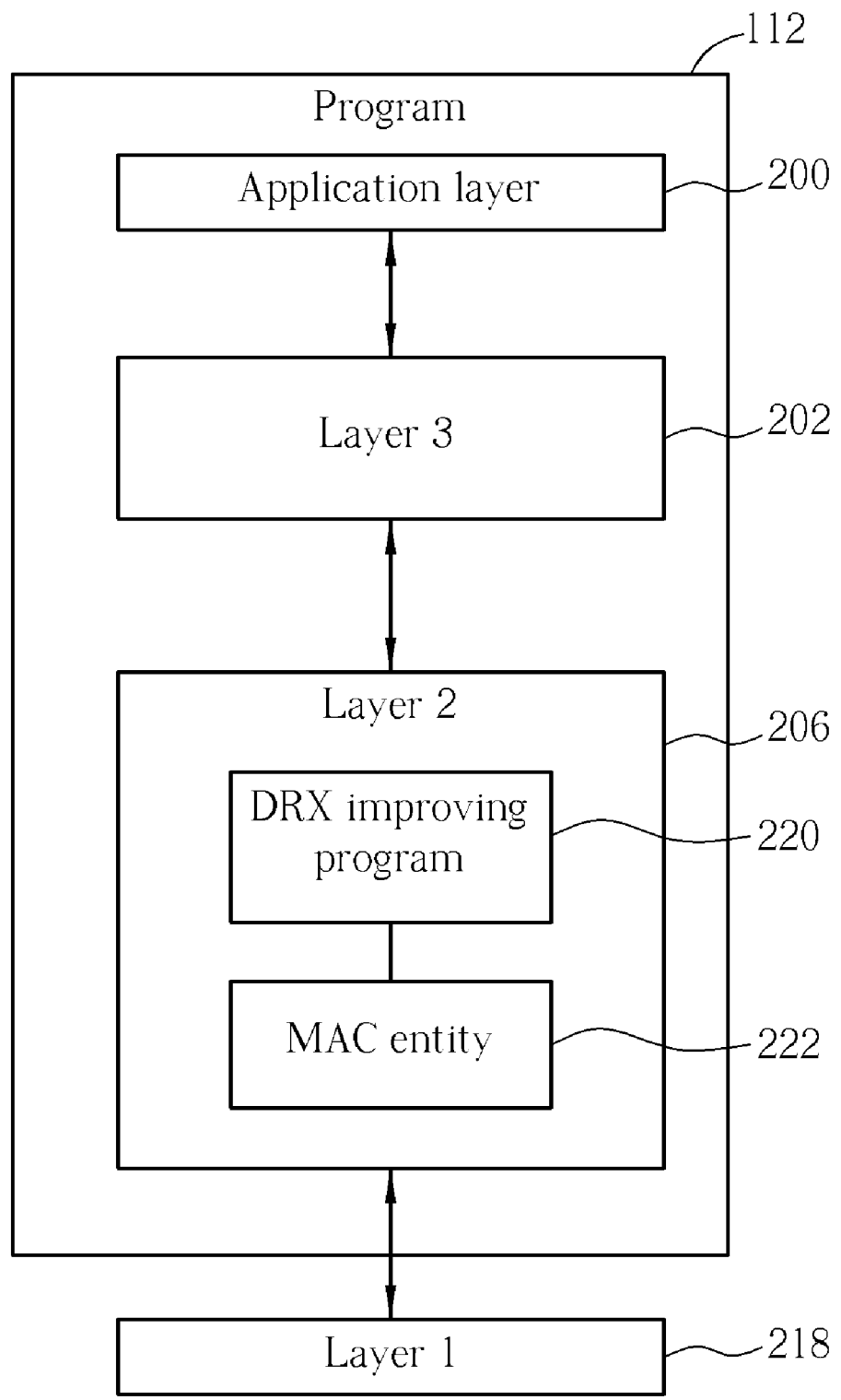
FIG. 3 is a diagram of program code of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 2 206 includes a Medium Access Control (MAC) entity 222 capable of simultaneously performing multiple Hybrid Automatic Repeat Request (HARQ) processes with a evolved Node-B (eNB) for packet reception and supporting a discontinuous reception (DRX) functionality. When the DRX functionality is executed by the MAC entity 222 according to Radio Resource Control (RRC) commands of the Layer 3 202, an embodiment of the present invention provides a DRX improving program 220 in the program 112 to enhance system scheduling efficiency.

Figure 4:
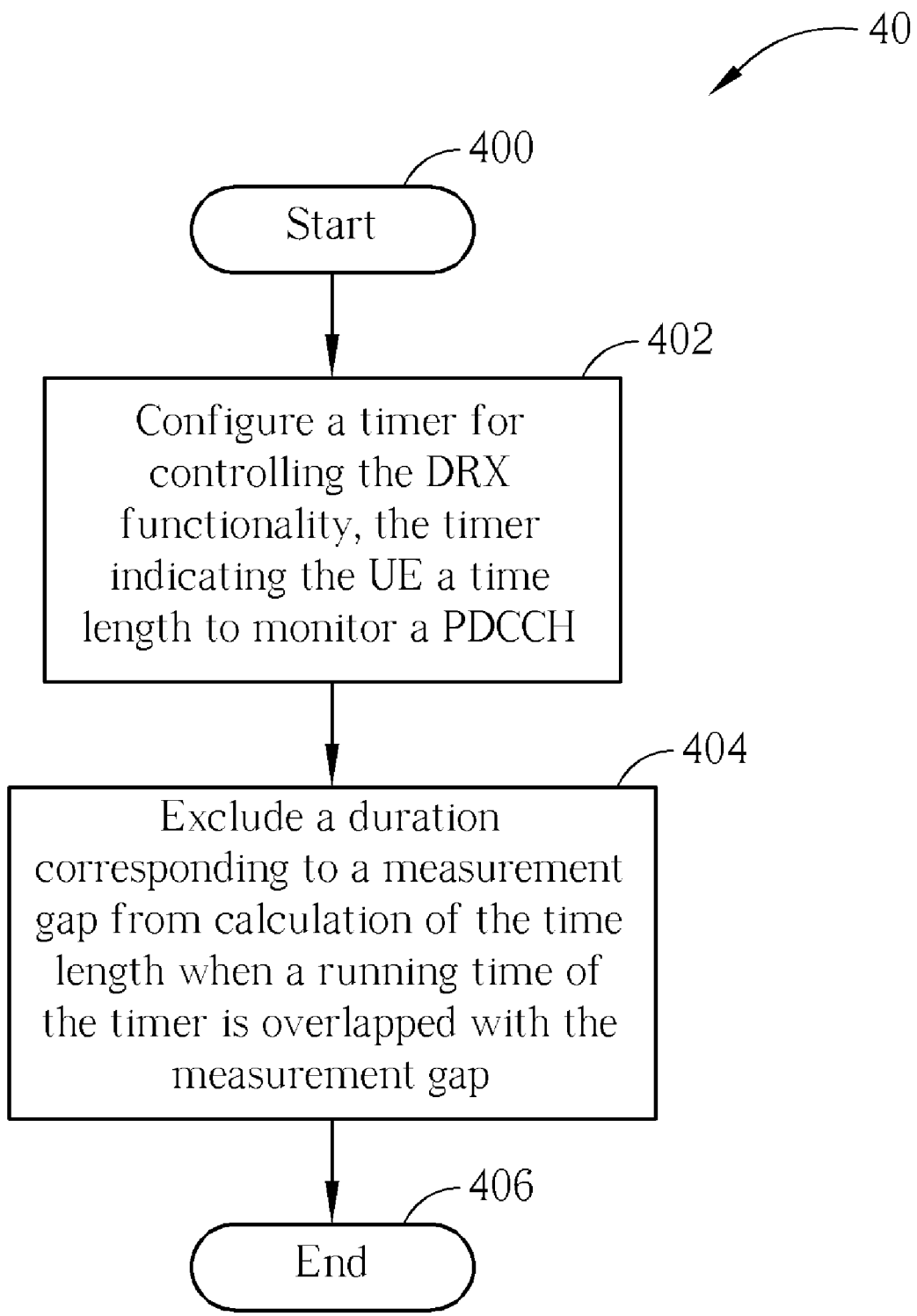
FIG. 4 is a flowchart of a process according to an embodiment of the present invention.

Please refer to FIG. 4, which illustrates a schematic diagram of a process 40 according to an embodiment of the present invention. The process 40 is utilized for improving the DRX functionality in a UE of a wireless communication system and can be compiled into the DRX improving program 220. The process 40 includes the following steps:

Step 400: Start.

Step 402: Configure a timer for controlling the DRX functionality, the timer indicating the UE a time length to monitor a Physical Downlink Control Channel (PDCCH).

Step 404: Exclude a duration corresponding to a measurement gap from calculation of the time length when a running time of the timer is overlapped with the measurement gap.

Step 406: End.

According to the process 40, the UE first configures the timer for controlling the DRX functionality. The said timer indicates the UE a time length to monitor the PDCCH. When the running time of the timer is overlapped with the measurement gap, the UE shall exclude the number of transmission time intervals (TTIs) corresponding to the measurement gap from calculation of the time length.

In other words, when the timer of the DRX functionality is overlapped with the measurement gap, since the UE is incapable of monitoring the PDCCH during the measurement gap, the embodiment of the present invention excludes the number of TTIs corresponding to the measurement gap from counting the time length of the timer, so that the total time the UE monitoring the PDCCH before expiry of the said timer would not be reduced by the measurement gap. Consequently, the embodiment of the present invention can enhance system scheduling efficiency.

Preferably, in the embodiment of the present invention, the said timer can be a DRX Retransmission Timer, a DRX Inactivity Timer or a On Duration Timer. The DRX Retransmission Timer is started when the UE expects to receive a downlink transmission; the DRX Inactivity Timer is started or restarted when the PDCCH indicates the UE to receive or transmit a new transmission; and the On Duration Timer is started when the UE enters into a DRX cycle. Detailed definitions and operations of the said timer can be referred to related specifications, and are not further narrated herein.

Figure 5:
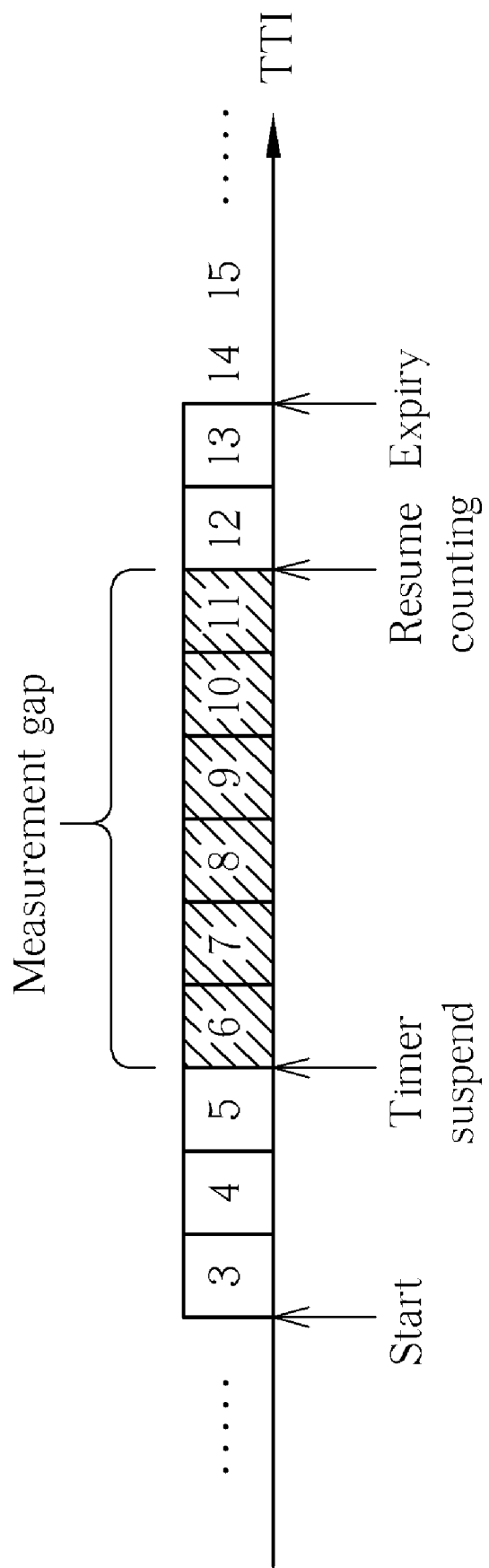
FIG. 5 is an exemplary embodiment according to the process of FIG. 4.

Please refer to FIG. 5, which is an exemplary embodiment according to the process 40 of FIG. 4. Taking the DRX Inactivity Timer for example, assume that the time length of the DRX Inactivity Timer is 5 TTIs and the DRX Inactivity Timer is started at the $3^{th}$ TTI. If a measurement gap occurs from the $6^{th}$ TTI to the $11^{th}$ TTI, the DRX Inactivity Timer is then suspended at the $6^{th}$ TTI and resumes counting at the $12^{th}$ TTI until the running time of the DRX Inactivity Timer reaches 5 TTIs, i.e. the $13^{th}$ TTI. Therefore, the embodiment of the present invention can prevent the total time the UE monitoring the PDCCH from being affected due to overlap between the measurement gap and the timer of the DRX functionality, so that the system scheduling efficiency can be enhanced.

In summary, the embodiment of the present invention provides a method for handling the timer of the DRX functionality and the measurement gap, such that the timer of the DRX functionality is unaffected by the measurement gap and the system scheduling efficiency can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a Discontinuous Reception (DRX) functionality in a user equipment (UE) of a wireless communication system, the method comprising:

configuring a timer for controlling the DRX functionality, the timer indicating the UE a time length to monitor a Physical Downlink Control Channel (PDCCH); and excluding a duration corresponding to a measurement gap from calculation of the time length when a running time of the timer is overlapped with the measurement gap.

2. The method of claim 1, wherein the measurement gap is assigned by a Radio Resource Control (RRC) layer for the UE to perform radio measurement.

3. The method of claim 1, wherein the UE is incapable of monitoring the PDCCH within the measurement gap.

4. The method of claim 1, wherein the timer is a DRX Retransmission Timer and is started when the UE expects to receive a downlink transmission.

5. The method of claim 1, wherein the timer is a DRX Inactivity Timer and is started or restarted when the PDCCH indicates the UE to receive or transmit a new transmission.

6. The method of claim 1, wherein the timer is an On Duration Timer and is started when the UE enters into a DRX cycle.

7. A communication device for improving a Discontinuous Reception (DRX) functionality in a user equipment (UE) of a wireless communication system, the communication device comprising:

a processor for executing a program; and
a memory coupled to the processor for storing the program;

wherein the program comprises:

configuring a timer for controlling the DRX functionality, the timer indicating the UE a time length to monitor a Physical Downlink Control Channel (PDCCH); and excluding a duration corresponding to a measurement gap from calculation of the time length when a running time of the timer is overlapped with the measurement gap.

8. The communication device of claim 7, wherein the measurement gap is assigned by a Radio Resource Control (RRC) layer for the UE to perform radio measurement.

9. The communication device of claim 7, wherein the UE is incapable of monitoring the PDCCH within the measurement gap.

10. The communication device of claim 7, wherein the timer is a DRX Retransmission Timer and is started when the UE expects to receive a downlink transmission.

11. The communication device of claim 7, wherein the timer is a DRX Inactivity Timer and is started or restarted when the PDCCH indicates the UE to receive or transmit a new transmission.

12. The communication device of claim 7, wherein the timer is an On Duration Timer and is started when the UE enters into a DRX cycle.

* * * * *